(12) United States Patent
Qi et al.

(10) Patent No.: US 9,132,538 B2
(45) Date of Patent: Sep. 15, 2015

(54) SINGLE SHAFT YAW ELECTRIC BOLT-TIGHTENING MACHINE

(75) Inventors: Zhaojun Qi, Dalian (CN); Yuejin Huang, Dalian (CN)

(73) Assignee: DALIAN DEXIN M & E TECHNOLOGY ENGINEERING CO., LTD., Dalian, Liaoning (CN)

( * ) Notice: Subject to any disclaimer, the term of this patent is extended or adjusted under 35 U.S.C. 154(b) by 370 days.

(21) Appl. No.: 13/880,982

(22) PCT Filed: Dec. 3, 2010

(86) PCT No.: PCT/CN2010/001957
§ 371 (c)(1),
(2), (4) Date: Apr. 23, 2013

(87) PCT Pub. No.: WO2012/055079
PCT Pub. Date: May 3, 2012

(65) Prior Publication Data
US 2013/0205955 A1  Aug. 15, 2013

(30) Foreign Application Priority Data
Oct. 25, 2010  (CN) .......................... 2010 1 0516739

(51) Int. Cl.
*B25B 23/147* (2006.01)
*B23P 19/06* (2006.01)
*B25B 23/14* (2006.01)

(52) U.S. Cl.
CPC ............... *B25B 23/147* (2013.01); *B23P 19/06* (2013.01); *B25B 23/14* (2013.01)

(58) Field of Classification Search
CPC ...... B25B 23/14; B25B 21/00; B25B 23/147; B25B 21/008; B25B 23/141; B23P 19/06
See application file for complete search history.

(56) References Cited

U.S. PATENT DOCUMENTS

| | | | | |
|---|---|---|---|---|
| 2,069,882 | A | * | 2/1937 | Hall ................................ 81/467 |
| 3,964,154 | A | * | 6/1976 | Auer ............................... 29/452 |
| 2001/0017067 | A1 | * | 8/2001 | Collins et al. ................ 81/57.39 |

* cited by examiner

*Primary Examiner* — Robert Scruggs
(74) *Attorney, Agent, or Firm* — Novick, Kim & Lee, PLLC; Allen Xue

(57) ABSTRACT

A single-shaft yaw electric bolt-tightening machine, comprising a base (1), a bracket (2), an electric tightening shaft assembly (14), a sleeve (15), a reaction force supporting board (16), a dedicated sleeve (17), a reaction force sleeve (18), a servomotor (19), a torque sensor (20), an angle sensor (21) and a connecting shaft (22). The bracket (2) is fixed on the base (1) and is provided with a rotary servomotor (3) and an encoder (4). The rotary servomotor (3) is connected with an output shaft (5) which is provided with a small pulley (6). The small pulley (6) is fitted with a big pulley (8) by a toothed belt (7). The big pulley (8) is connected with a rotating shaft (9). A guide rod (12) is connected with a rotating arm (10) by a shaft sleeve (11) and is fixed on a cover-plate bracket (13) in which the electric tightening shaft assembly (14) is fixed.

6 Claims, 1 Drawing Sheet

SINGLE SHAFT YAW ELECTRIC BOLT-TIGHTENING MACHINE

TECHNICAL FIELD

The present invention relates to a field of installation equipment for wind power generating machinery, more particularly to a single-shaft yaw electric bolt-tightening machine.

BACKGROUND

At present, during assembling and producing yaw apparatus by major wind power generating manufacturers, tightening tools, such as pneumatic impact wrench and hydraulic wrench, are generally used to tighten bolts on the yaw apparatus during bolt-tightening process. However, this kind of tightening tools has disadvantages including noise, vibration, inconvenient operation, high human cost, incapableness of ensuring the torque precision of the tightened bolt and deformation of yaw members; most importantly, the assembling quality is hard to be ensured. For example, with regard to the noise, the noise of the pneumatic impact wrench is more than 90 DB, and the noise of the hydraulic wrench is more than 80 DB; with regard to the torque precision, the torque error of the pneumatic impact wrench is about 30%, and the torque error of the pneumatic impact wrench is about 20%.

SUMMARY OF THE INVENTION

In view of the defects of the existing products, the present invention provides a single-shaft yaw electric bolt-tightening machine.

In order to realize the above purpose, the technical solution of the present invention is as follows:

A single-shaft yaw electric bolt-tightening machine, comprising a base, a bracket, a rotary servomotor, an encoder, an output shaft, a small pulley, a toothed belt, a big pulley, a rotating shaft, a rotating arm, a shaft sleeve, a guide rod, a cover-plate bracket, an electric tightening shaft assembly, a sleeve, a reaction force supporting board, a dedicated sleeve, a reaction force sleeve, a servomotor, a torque sensor, an angle sensor and a connecting shaft; the bracket is fixed on the base and is provided with the rotary servomotor and the encoder; the rotary servomotor is connected with the output shaft which is provided with the small pulley; the small pulley is fitted with the big pulley by the toothed belt; the big pulley is connected with the rotating shaft; the rotating arm is provided with the shaft sleeve, and the guide rod is connected with the rotating arm by the shaft sleeve and is fixed on the cover-plate bracket, in which the electric tightening shaft assembly is fixed.

The servomotor, the torque sensor, the angle sensor, the connecting shaft, an electric tightener, the reaction force supporting board, the dedicated sleeve and the reaction force sleeve are mounted on the tightening shaft assembly; the torque sensor and the angle sensor are connected with the electric tightening shaft assembly through the connecting shaft, and the electric tightening shaft assembly is connected with the reaction force supporting board through the tightening shaft sleeve; the dedicated sleeve is connected with the electric tightening shaft assembly and is disposed at a lower side of the reaction force supporting board, while the reaction force sleeve is fixed at the lower side of the reaction force supporting board.

The rotating arm driven by the big pulley is capable of carrying out 360 degree reciprocating circular motion.

The guide rod includes two guide rods that are in parallel with each other and in parallel with the rotating arm.

The shaft sleeve is capable of sliding back-and-forth relative to the guide rod and being positioned.

The reaction force supporting board has an offset of 2-3 mm.

The reaction force sleeve includes two reaction force sleeves which are symmetrical to each other with respect to the dedicated sleeve, and a distance therebetween is adjustable.

By adopting the above structural designs, the single-shaft yaw electric bolt-tightening machine, by an automatic rotary system, a diameter-changing device, the electric tightener, and an automatic nut-identification and reaction force device, realizes auto-alignment, diagonal bolt-tightening in steps and layers according to preset programs and technological requirements, memory function with respect to unqualified bolts, realizes automatic working process of the tightening machine while reaching a technologically required torque value, further realizes to tighten bolts of yaw meters with different pitch circles. Moreover, the single-shaft yaw electric bolt-tightening machine has advantages of simple operation, high tightening precision, uniform pressing force and the position memory of unqualified products, and realizes unmanned automatic tightening during the whole tightening process. The noise of the single-shaft yaw electric bolt-tightening machine is lower than or equal to 50 DB, and the torque error thereof is about 3%, thereby the noise pollution being reduced and the working precision being improved.

DETAILED DESCRIPTION OF THE EMBODIMENTS

Figure 1:
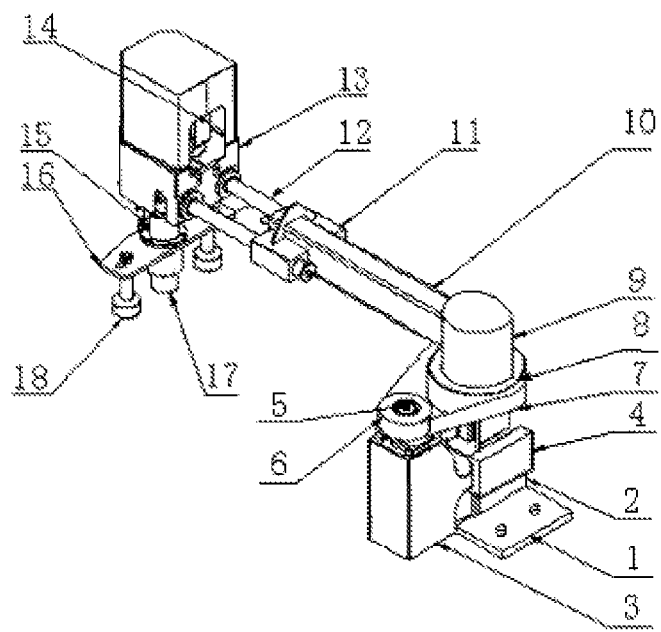
FIG. 1 is a structural schematic diagram of the present invention.
Figure 2:
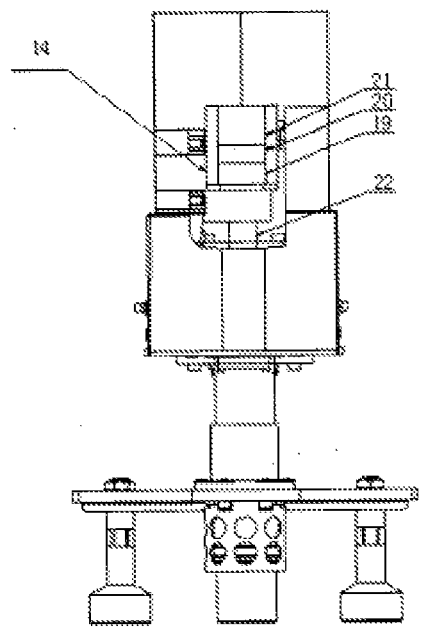
FIG. 2 is a cross-section view of the electric tightening shaft assembly.

The reference numbers in FIGS. 1 and 2 are as follows: base 1; bracket 2; rotary servomotor 3; encoder 4; output shaft 5; small pulley 6; toothed belt 7; big pulley 8; rotating shaft 9; rotating arm 10; shaft sleeve 11; guide rod 12; cover-plate bracket 13; electric tightening shaft assembly 14; sleeve 15; reaction force supporting board 16; dedicated sleeve 17; reaction force sleeve 18; servomotor 19; torque sensor 20; angle sensor 21; connecting shaft 22.

A single-shaft yaw electric bolt-tightening machine, as shown in a schematic diagram thereof in FIGS. 1 and 2, mainly comprises: a base 1, a bracket 2, a rotary servomotor 3, an encoder 4, an output shaft 5, a small pulley 6, a toothed belt 7, a big pulley 8, a rotating shaft 9, a rotating arm 10, a shaft sleeve 11, a guide rod 12, a cover-plate bracket 13, an electric tightening shaft assembly 14, a sleeve 15, a reaction force supporting board 16, a dedicated sleeve 17, a reaction force sleeve 18, a servomotor 19, a torque sensor 20, an angle sensor 21 and a connecting shaft 22; the bracket 2 is fixed on the base 1 and is provided with the rotary servomotor 3 and the encoder 4; the rotary servomotor 3 is connected with the output shaft 5 which is provided with the small pulley 6; the small pulley 6 is fitted with the big pulley 8 by the toothed belt 7; the big pulley 8 is connected with the rotating shaft 9 which is connected with the rotating arm 10; the rotating arm 10 is provided with the shaft sleeve 11, and the guide rod 12 is connected with the rotating arm 10 by the shaft sleeve 11 and is fixed on the cover-plate bracket 13 in which the electric tightening shaft assembly 14 is fixed; the servomotor 19, the torque sensor 20, the angle sensor 21, the connecting shaft 22, an electric tightener, the reaction force supporting board 16, the dedicated sleeve 17 and the reaction force sleeve 18 are mounted on the tightening shaft assembly 14; the torque sensor 20 and the angle sensor 21 are connected with the electric tightening shaft assembly 14 through the connecting shaft 22, and the electric tightening shaft assembly 14 is connected with the reaction force supporting board 16 through the sleeve 15; the dedicated sleeve 17 is connected with the electric tightening shaft assembly 14 and is disposed at a lower side of the reaction force supporting board 16, and the reaction force sleeve 18 is fixed at the lower side of the reaction force supporting board 16.

The working principle of the present invention is as follows:

At first, the working radius of the single-shaft yaw electric bolt-tightening machine is set by adjusting a relative position of the shaft sleeve 11 and the guide rod 12 on the rotating arm 10; further, a startup button on a control panel is operated, such that the output shaft 5 is driven to rotate due to the running of the rotary servomotor 3. Then, driven by the output shaft 5, the small pulley 6 rotates and drives the toothed belt 7 to rotate; driven by the toothed belt 7, the big pulley 8 rotates and drives the rotating shaft 9 to rotate, and the rotating shaft 9 drives the rotating arm 10 to carry out a diagonal movement on the circumference. Moreover, an offset of the reaction force supporting board 16 is controlled by controlling the electric tightening shaft assembly 14, and the dedicated sleeve 17 is controlled to align and confirm a null position of the bolt for an initial tightening, while the two reaction force sleeves 18 are carrying out reaction force protection. The tightening sequence of the electric tightening shaft assembly is controlled by a control system for the electric tightening, and positions of unqualified products are memorized, while the information is fed back and stored to a computer.

The operating steps of the present invention are as follows:

Step one: adjusting the relative position of the shaft sleeve 11 and the guide rod 12 according to the specification of the yaw meter, namely adjusting the working radius of the tightening machine;

Step two: according to the specification of the yaw meter, selecting different tightening procedures (for example, the number of the bolts to be tightened, target torque, control method and so on), namely programming (programs for different specifications have been stored in the system);

Step three: pressing the startup button on the control panel, thereby the equipment starting to work according to the preset program.

The invention claimed is:

1. A single-shaft yaw electric bolt-tightening machine, comprising:

a base, a bracket, a rotary servomotor, an encoder, an output shaft, a small pulley, a toothed belt, a big pulley, a rotating shaft, a rotating arm, a shaft sleeve, a guide rod, a cover-plate bracket, an electric tightening shaft assembly, a sleeve, a reaction force supporting board, a dedicated sleeve, a reaction force sleeve, a servomotor, a torque sensor, an angle sensor and a connecting shaft;

the bracket is fixed on the base and is provided with the rotary servomotor and the encoder; the rotary servomotor is connected with the output shaft which is provided with the small pulley, the small pulley is fitted with the big pulley by the toothed belt; the big pulley is connected with the rotating shaft; the rotating arm is provided with the shaft sleeve, and the guide rod is connected with the rotating arm by the shaft sleeve and is fixed on the cover-plate bracket in which the electric tightening shaft assembly is fixed; the servomotor, the torque sensor, the angle sensor, the connecting shaft, an electric tightener, the reaction force supporting board, the dedicated sleeve and the reaction force sleeve are mounted on the tightening shaft assembly; the torque sensor and the angle sensor are connected with the electric tightening shaft assembly through the connecting shaft, and the electric tightening shaft assembly is connected with the reaction force supporting board through the tightening shaft sleeve; the dedicated sleeve is connected with the electric tightening shaft assembly and is disposed at a lower side of the reaction force supporting board, while the reaction force sleeve is fixed at the lower side of the reaction force supporting board.

2. The single-shaft yaw electric bolt-tightening machine according to claim 1, wherein the rotating arm driven by the big pulley is capable of carrying out 360 degree reciprocating circular motion.

3. The single-shaft yaw electric bolt-tightening machine according to claim 1, wherein the guide rod includes two guide rods that are in parallel with each other and in parallel with the rotating arm.

4. The single-shaft yaw electric bolt-tightening machine according to claim 1, wherein the shaft sleeve is capable of sliding back-and-forth relative to the guide rod and being positioned.

5. The single-shaft yaw electric bolt-tightening machine according to claim 1, wherein the reaction force supporting board has an offset of 2-3 mm.

6. The single-shaft yaw electric bolt-tightening machine according to claim 1, wherein the reaction force sleeve includes two reaction force sleeves which are symmetrical to each other with respect to the dedicated sleeve and a distance therebetween is adjustable.

* * * * *